United States Patent
Gries et al.

(10) Patent No.: US 6,921,067 B2
(45) Date of Patent: Jul. 26, 2005

(54) HYDRAULIC DAMPING MOUNT

(75) Inventors: Jürgen Gries, Lage (DE); Arndt Graeve, Koblenz (DE)

(73) Assignee: Trelleborg Automotive Technical Centre GmbH, Hoehr-Grenzhausen (DE)

( * ) Notice: Subject to any disclaimer, the term of this patent is extended or adjusted under 35 U.S.C. 154(b) by 0 days.

(21) Appl. No.: 10/921,574

(22) Filed: Aug. 19, 2004

(65) Prior Publication Data

US 2005/0051936 A1 Mar. 10, 2005

Related U.S. Application Data

(63) Continuation of application No. PCT/EP03/01250, filed on Feb. 7, 2003.

(30) Foreign Application Priority Data

Feb. 19, 2002 (DE) .......................................... 102 06 927

(51) Int. Cl.[7] .......................... F16F 13/00; F16F 15/00; F16F 5/00; F16F 9/00; F16M 11/00
(52) U.S. Cl. .............................. 267/140.14; 267/140.15
(58) Field of Search ...................... 267/140.11, 140.13, 267/140.14, 140.15, 141.2, 141.3

(56) References Cited

U.S. PATENT DOCUMENTS

| | | | | |
|---|---|---|---|---|
| 4,836,515 A | | 6/1989 | Franz et al. | |
| 4,872,652 A | * | 10/1989 | Rohner et al. | 267/140.14 |
| 5,398,917 A | * | 3/1995 | Carlson et al. | 267/140.14 |
| 5,601,280 A | * | 2/1997 | Nagaya et al. | 267/140.14 |
| 5,653,427 A | * | 8/1997 | Matsuda et al. | 267/140.14 |
| 5,911,412 A | | 6/1999 | Durand et al. | |
| 6,032,937 A | * | 3/2000 | Kojima et al. | 267/140.14 |
| 6,304,074 B1 | | 10/2001 | Waffenschmidt | |
| 6,523,816 B1 | * | 2/2003 | Gastineau et al. | 267/140.14 |

FOREIGN PATENT DOCUMENTS

| | | |
|---|---|---|
| DE | 36 19 687 A1 | 12/1987 |
| DE | 196 52 502 C2 | 6/1998 |
| JP | 59-117930 * | 7/1984 |
| JP | 5-248480 * | 9/1993 |
| JP | 60185568 * | 7/1994 |
| JP | 08080751 | 3/1996 |
| JP | 09222148 | 8/1997 |
| JP | 11051109 | 2/1999 |

* cited by examiner

Primary Examiner—Robert A. Siconolfi
Assistant Examiner—Devon Kramer
(74) Attorney, Agent, or Firm—Laurence A. Greenberg; Werner H. Stemer; Ralph E. Locher

(57) ABSTRACT

A hydraulically damping mount contains a working chamber and a compensation chamber that are filled with a hydraulically damping liquid and are separated by an intermediate plate. The working chamber and the compensation chamber are interconnected by an overflow channel and a bypass channel that can be opened and closed by an actuator that can be electromagnetically actuated in the axial direction. Accordingly, the actuator is embodied as a sliding sleeve in the form of a hollow cylinder defining the bypass channel, and contains a radially protruding armature on its outer side. The armature is received in the compensation chamber. The armature co-operates with an electromagnetic coil received in the intermediate plate, and with a baffle plate for opening or closing the bypass channel. In this way, small regulating forces and a compact structure are produced.

11 Claims, 2 Drawing Sheets

HYDRAULIC DAMPING MOUNT

CROSS-REFERENCE TO RELATED APPLICATION

This is a continuing application, under 35 U.S.C. § 120, of copending international application No. PCT/EP03/01250, filed Feb. 7, 2003, which designated the United States; this application also claims the priority, under 35 U.S.C. § 119, of German patent application No. 102 06 927.1, filed Feb. 19, 2002; the prior applications are herewith incorporated by reference in their entirety.

BACKGROUND OF THE INVENTION

Field of the Invention

The invention relates to a hydraulic damping mount containing a working chamber and a compensation chamber filled with a hydraulic fluid and separated from each other by a partition plate. The working chamber and the compensation chamber communicate with each other through an overflow channel and a bypass channel, the latter being opened and closed by an electromagnetic axially activatable actuator.

One such mount, used as an automotive engine mount, is known from U.S. Pat. No. 5,601,280. The mount contains a working chamber defined by an elastomeric resilient mounting element, the working chamber being separated from a compensation chamber by a partition plate. The compensation chamber features an overflow channel and a bypass channel, each oriented axially. The working chamber and compensation chamber are filled with a hydraulic fluid. Assigned to the bypass channel is an activatable actuator containing a switching valve disposed in the working chamber. Via a valve stem, the switching valve is connected to an electromagnetic controller located outside of the housing surrounding the fluid chambers. By arranging the switching valve in the working chamber the actuator works against the hydraulic pressure of the working chamber, thus necessitating relatively high actuating forces. Furthermore, arranging the electromagnetic controller outside of the housing necessitates sealing of the valve stem, again adding to the "footprint" of the mount.

Known from German Patent DE 196 52 502 C2 is a further hydraulic damping mount in which the bypass channel is opened and closed by a plunger-type actuator. The actuator is activated pneumatically for which an air chamber surrounding the compensation chamber is provided. Here too, the actuator works against the hydraulic pressure in the working chamber.

SUMMARY OF THE INVENTION

It is accordingly an object of the invention to provide a hydraulic damping mount which overcomes the above-mentioned disadvantages of the prior art devices of this general type, which has a smaller footprint and requires reduced actuating forces.

With the foregoing and other objects in view there is provided, in accordance with the invention, a hydraulic damping mount. The mount contains a partition plate having an overflow channel and a bypass channel with an electromagnetic solenoid mounted in the partition plate. A housing has a working chamber and a compensation chamber filled with a hydraulic fluid and separated from each other by the partition plate. The working chamber and the compensation chamber communicate with each other through the overflow channel and the bypass channel. A flapper is provided for opening and closing the bypass channel. An electromagnetic axially activatable actuator assists in the opening and closing of the bypass channel. The actuator is configured as a tubular sliding sleeve further defining the bypass channel and contains at an outer side a radially protruding armature accommodated in the compensation chamber. The armature cooperates with the electromagnetic solenoid and with the flapper for opening and closing the bypass channel.

To achieve this object it is proposed in a hydraulic damping mount of the aforementioned to configure the actuator as a tubular sliding sleeve which defines the bypass channel and contains at its outer side a radially protruding armature accommodated in the compensation chamber and which cooperates, on the one hand, with an electromagnetic solenoid mounted in the partition plate and, on the other, with a flapper opening and closing the bypass channel.

In the mount in accordance with the invention the actuating forces are now reduced because the actuator mounted in the partition plate contains an armature accommodated in the compensation chamber and acts as the switching valve, as a result of which it now no longer needs to work against the pressure of the working chamber. Furthermore, the mount in accordance with the invention excels by a small footprint because the complete electromagnetic system is now accommodated within the mount housing. In this arrangement the electromagnetic solenoid actuating the actuator is mounted in the partition plate. This structure now makes it possible to eliminate sealing the actuator from the housing. Apart from this, the resulting dissipated heat is given off to the hydraulic fluid.

In the fitted condition, the activatable actuator assigned to the bypass channel now permits controlling the stiffness response irrespective of the outer circumference. Thus, to advantage, the bypass channel is now opened when the mounted engine is idling, resulting in a reduction in stiffness response, while in driving operation the bypass channel is closed.

Advantageously a return spring is assigned to the actuator, resulting in the actuator being returned to its starting position on a power failure.

In another advantageous aspect the return spring is configured helical and defined by the inner circumference of the actuator. This is achieved to advantage by a boss supporting the return spring being provided at the inner circumference of the tubular actuator. The face of the return spring is supported by the partition plate.

In another advantageous aspect the armature of the actuator contains a control cone that substantially increases the actuating force at the start of the stroke.

To reduce any friction forces occurring the actuator contains a tubular sliding sleeve of an antimagnetic material, preferably plastics material.

Preferably, the flapper contains a staggered circumferential configuration of ridges defined at the partition plate. In the activated condition of the actuator the armature is lifted from the flapper, resulting in the bypass channel being fluidly communicated to the compensation chamber.

In yet another advantageous aspect a decoupler diaphragm is disposed in the partition plate that receives the force of the hydraulic fluid in the working chamber. Such a decoupler diaphragm, known in principle in the hydraulic damping mounts, prevents transfer of the fluid through the overflow channel and thus hydraulic damping at high frequencies and small amplitudes.

In still another advantageous aspect the excursion of the decoupler diaphragm is controllable by the electromagnetic solenoid.

In another aspect the decoupler diaphragm is made of an elastomer and contains an insert of a magnetizable material, as a result of which when the electromagnetic solenoid is activated, the excursion of the decoupler diaphragm can be restricted.

In yet another advantageous aspect the decoupler diaphragm is configured annular.

Other features which are considered as characteristic for the invention are set forth in the appended claims.

Although the invention is illustrated and described herein as embodied in a hydraulic damping mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
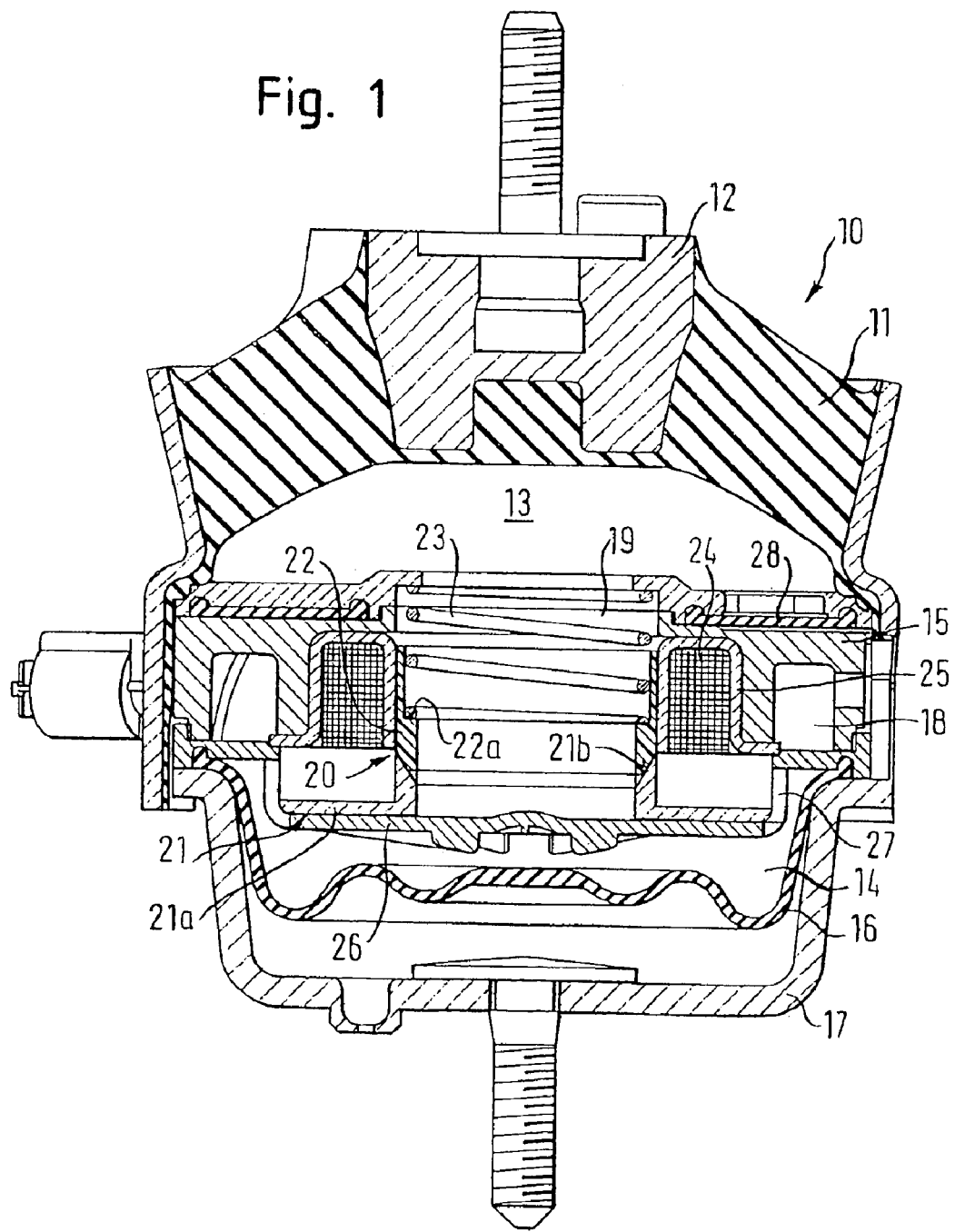
FIG. 1 is a diagrammatic, vertical sectional view through a first embodiment of a mount in accordance with the invention.

Referring now to the figures of the drawing in detail and first, particularly, to FIG. 1 thereof, there is shown a hydraulic damping mount 10 for application as an automotive engine mount. The mount 10 contains an elastomeric resilient mounting element 11 supporting a mount core 12 at an end side. The resilient mounting element 11 is supported edgewise by a housing 17 defining the outer circumference of the mount.

The resilient mounting element 11 defines a working chamber 13 that is separated from a compensation chamber 14 by a partition plate 15. The compensation chamber 14 is defined by a flexible elastomeric compensation cap 16.

The working chamber 13 and the compensation chamber 14 are filled with a hydraulic fluid. Provided in the partition plate 15 is a spiral overflow channel 18 communicating with the working chamber 13 and the compensation chamber 14. In addition, the working chamber 13 and the compensation chamber 14 are connected by an axial bypass channel 19 disposed in the center of the partition plate 15.

The bypass channel 19 is assigned an activatable actuator 20 for opening and closing the bypass channel 19. The actuator 20 is configured tubular and defines the bypass channel 19 edgewise. The actuator 20 cooperates facewise with a flapper 26 disposed in the compensation chamber 14 and defined by ridges 27 disposed staggered about the circumference of the flapper 26 at the underside of the partition plate 15.

The actuator 20 contains an armature 21 formed of a magnetizable material and configured with an annular horizontally oriented portion 21a. In the closing position of the actuator 20 the portion 21a of the armature 21 contacts the inner side of the flapper 26 in closing off the bypass channel. To boost the actuating force at the start of the stroke, the armature 21 furthermore contains a control cone 21b. Positively defined at the control cone 21b is a sliding sleeve 22 of a non-magnetic plastic material to achieve frictionless guidance of the actuator 20 in an inner circumference of the bypass channel 19. Supported by a boss 22a of the sliding sleeve 22 is a helical return spring 23 the face of which contacts the partition plate 15.

Mounted in the partition plate 15 is an electromagnetic solenoid 24 surrounded by an approximately U-shaped yoke 25. The electromagnetic solenoid 24 cooperates with the armature 21 of the actuator 20.

Disposed in the region of the working chamber 13 at the partition plate 15 is a decoupler diaphragm 28 configured annular and charged with the fluid of the working chamber 13.

The functioning of the mount 10 will now be detailed.

In the closing condition of the actuator 20 as shown and as caused by the return spring 23, the armature 21 of the actuator 20 contacts the flapper 26 in closing off the bypass channel 19. In the closed position of the bypass channel 19 the response of the mount 10 is stiff, as desired, for example, when the engine is powered.

Reducing the stiffness, as is desired, for example, when the engine is idling, is achieved by opening the bypass channel 19. For this purpose the electromagnetic solenoid 24 is activated, resulting in the actuator 20 being displaced axially against the return spring 23. Since the armature 21 is disposed in the compensation chamber 14 only relatively low actuating forces are needed. Furthermore, the sliding sleeve 22 provided on the actuator 20 reduces the resulting friction forces. The control cone 21b provided at the armature 21 results in the actuating force being boosted at the start of the stroke.

Since the complete electromagnetic system, in other words the armature 21 and the electromagnetic solenoid 24 is disposed within the housing 17, the mount 10 is characterized by a very small footprint. In addition, there is now no need for sealing the actuator 20 from the housing 17, since the actuator 20 is disposed within the housing 17. Furthermore, heat dissipated by the armature 21 is given off to the hydraulic fluid.

Figure 2:
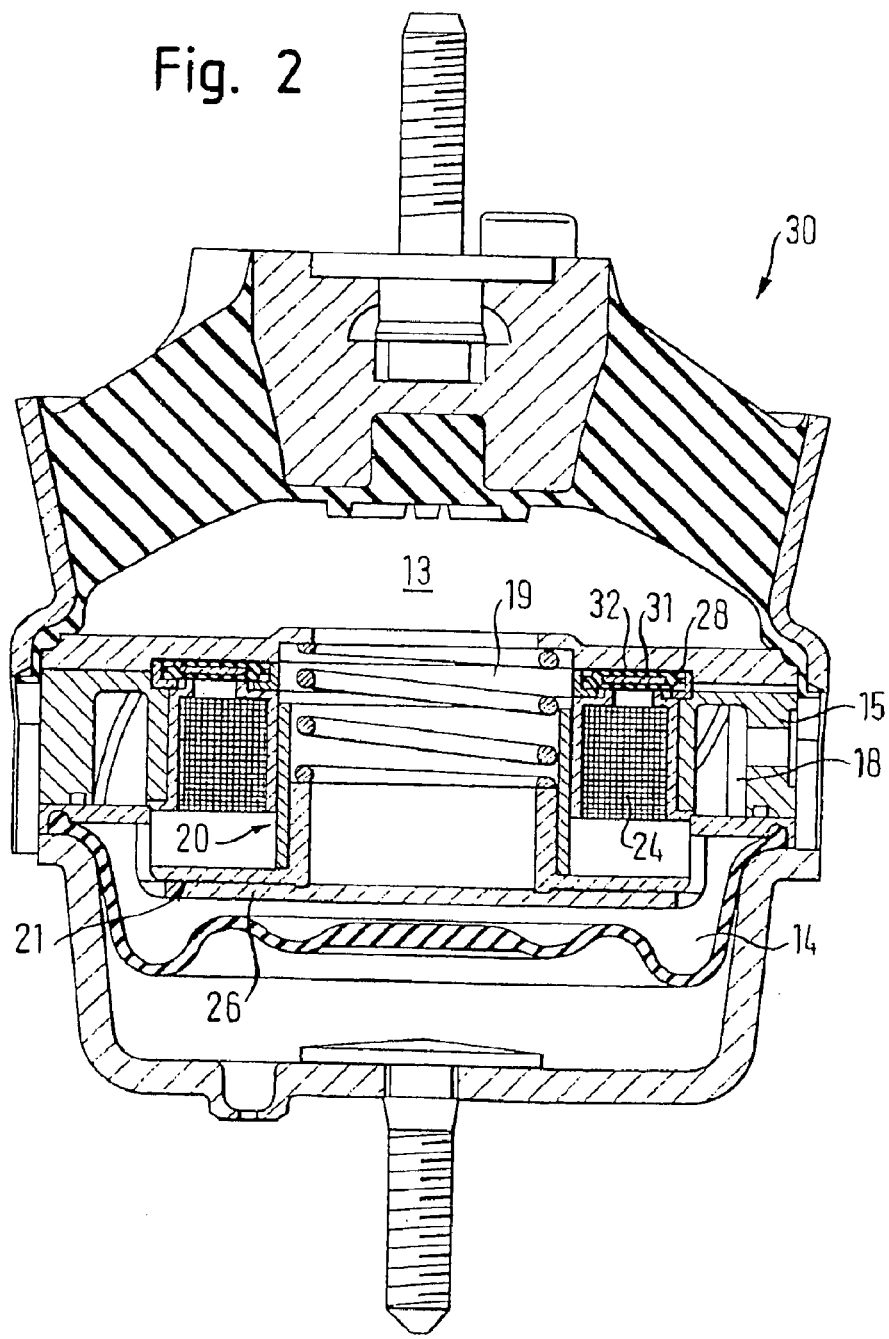
FIG. 2 is a diagrammatic, vertical sectional view through a second embodiment of a mount in accordance with the invention.

Referring now to FIG. 2 there is illustrated a mount 30, for the description of which like reference numerals are used for like components in the basically similar configuration of the mount 10 as shown in FIG. 1.

The mount 30 features the working chamber 13 and the compensation chamber 14 separated from each other by the partition plate 15. The working chamber 13 and the compensation chamber 14 communicate with each other via the overflow channel 18 and the bypass channel 19. Assigned to the bypass channel 19 is the actuator 20 that cooperates with the flapper 26 disposed in the compensation chamber.

The actuator 20 contains the armature 21 cooperating with the electromagnetic solenoid 24 disposed in the partition plate 15. Configured in the partition plate 15 is a cage 32 in which the annular elastomeric decoupler diaphragm 28 is mounted. The decoupler diaphragm 28 contains an insert 31 of a magnetizable material, for example metal. The insert 31 cooperates with the solenoid 24, resulting in the excursion of the decoupler diaphragm 28 being controllable.

Activating the solenoid 24 thus, on the one hand, opens the bypass channel 19 and, on the other, disables the decoupling function of the decoupler diaphragm 28. This switch position is selected when the engine is idling so that the pumping effect of the mount 30 is maximized, whereas when the engine is powered, the bypass channel 19 is closed and the decoupler diaphragm 28 is released.

We claim:

1. A hydraulic damping mount, comprising:

a partition plate having an overflow channel formed therein and a bypass channel formed therein;

an electromagnetic solenoid mounted in said partition plate;

a housing having a working chamber formed therein and a compensation chamber formed therein filled with a hydraulic fluid and separated from each other by said partition plate, said working chamber and said compensation chamber communicating with each other through said overflow channel and said bypass channel;

a flapper for opening and closing said bypass channel; and an electromagnetic axially activatable actuator for assisting in the opening and closing of said bypass channel, said actuator configured as a tubular sliding sleeve further defining said bypass channel and contains at an outer side a radially protruding armature accommodated in said compensation chamber, said armature cooperates with said electromagnetic solenoid and with said flapper for opening and closing said bypass channel.

2. The mount according to claim 1, further comprising a return spring associated with said actuator.

3. The mount according to claim 2, wherein said return spring is configured helical and defined by an inner circumference of said actuator.

4. The mount according to claim 1, wherein said armature of said actuator contains a control cone.

5. The mount according to claim 1, wherein said tubular sliding sleeve is formed of a non-magnetic material.

6. The mount according to claim 1, wherein said flapper has a staggered circumferential configuration of ridges defined at said partition plate.

7. The mount according to claim 1, further comprising a decoupler diaphragm disposed in said partition plate and receiving a force transmitted by said hydraulic fluid in said working chamber.

8. The mount according to claim 7, wherein an excursion of said decoupler diaphragm is controlled by said electromagnetic solenoid.

9. The mount according to claim 8, wherein said decoupler diaphragm is made of an elastomer and has an insert formed of a magnetizable material.

10. The mount according to claim 7, wherein said decoupler diaphragm is configured annularly.

11. The mount according to claim 5, wherein said non-magnetic material is a plastic material.

\* \* \* \* \*